United States Patent [19]

Zettergren

[11] 4,337,798

[45] Jul. 6, 1982

[54] CONVERTER FOR VALVES

[76] Inventor: Ted Zettergren, Kungsgarden 3402, 870 52 Nyland, Sweden

[21] Appl. No.: 193,535

[22] Filed: Oct. 3, 1980

[30] Foreign Application Priority Data

Oct. 11, 1979 [SE] Sweden ............................... 7908452

[51] Int. Cl.³ ............................................ F16K 11/16

[52] U.S. Cl. ............................ 137/627.5; 137/596.17

[58] Field of Search ................ 137/627.5, 596, 596.17; 91/457

[56] References Cited

U.S. PATENT DOCUMENTS

| | | | |
|---|---|---|---|
| 2,889,814 | 6/1959 | Mercier | 91/457 X |
| 3,112,769 | 12/1963 | Broadwell | 137/596.17 X |
| 3,150,856 | 9/1964 | Deibel | 137/627.5 X |
| 3,354,894 | 11/1967 | Stoll | 137/627.5 X |
| 3,874,406 | 4/1975 | Von Loewis | 137/596.17 X |
| 4,077,674 | 3/1978 | Doto | 137/627.5 X |
| 4,117,865 | 10/1978 | Beck | 137/627.5 |

FOREIGN PATENT DOCUMENTS

| | | | |
|---|---|---|---|
| 775762 | 5/1957 | United Kingdom | 137/627.5 |

*Primary Examiner*—Robert G. Nilson

*Attorney, Agent, or Firm*—Silverman, Cass & Singer, Ltd.

[57] ABSTRACT

A converter for electromagnetic operation of a valve is provided with a tubular, hydraulically balanced piston which has an upper end whose outer diameter is only slightly larger than its inner diameter so that it forms a valve seat with the pressure pin of the magnet to produce a slight difference in coupling back pressure in magnetic operation of the valve. Preferably, the electromagnet only operates in on-off states.

3 Claims, 3 Drawing Figures

CONVERTER FOR VALVES

This invention relates to a converter for electrohydraulic or electropneumatic conversion.

Converters of this kind are used in many connections, especially for machines such as loading and lifting machines, which are controlled by electric impulses.

Electrohydraulic converters exist in a great number of different constructions, all of which, however, show the disadvantage of being not suited for pulsed voltage feed in connection with proportional control.

The use of pulsed voltage has the advantages of reducing occurring hysteresis effects in the converter as well as in the selector valve or corresponding device controlled by the converter. The hysteresis effect is due primarily to inner friction, springs and different areas, against which the pressure medium in the converter acts.

The disadvantages of known converters are among other things continuous oil consumption, sensitivity to dirt, slow pressure build-up, slow drainage, overlap between inlet and outlet for the pressure medium in the converter, and the requirement of a proportional magnet.

Converters, which are coupled back or balanced, further involve a great safety risk of complete modulation at the outage of voltage or pressure.

The converter according to the present invention eliminates the aforesaid disadvantages. In addition to being suitable to be used for operation according to two different principles at pulsed feed, the converter can be used also for direct voltage control with a proportional magnet.

The present invention, thus, relates to a converter for electrohydraulic or electropneumatic conversion, comprising a housing, a piston movable in said housing, a pressure pin reciprocatory relative to the piston by means of a magnet, and a channel for the supply of pressure medium, a control channel for the inflow and outflow of control pressure medium, and a channel for draining the converter. The invention is characterized in that the piston is tubular and includes a channel extending through the piston, which runs in a cylinder bore, above and beneath which a respective cavity are located, in which upper cavity the said pressure pin is located and into which said drainage channel opens, and into which lower cavity the control channel opens, that the pressure channel opens into said cylinder bore, at which mouth a space between the piston and the cylinder bore wall is located and extends downward to the lower piston end, which has a preferably conically shaped widening so that the widening and the transition of the lower cavity to the cylinder bore from a first seat valve, which is closed when the piston is in its uppermost position, and the upper end of the inner channel of the piston together with the free end of the pressure pin form a second seat valve, and that a weak return spring is provided to press the piston against its uppermost position.

Figure 1:
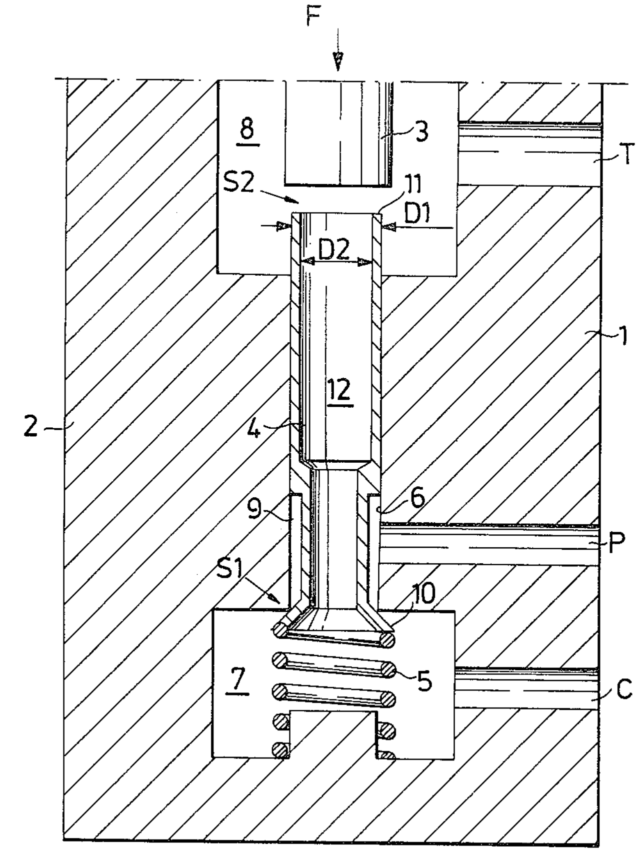
Figure 2:
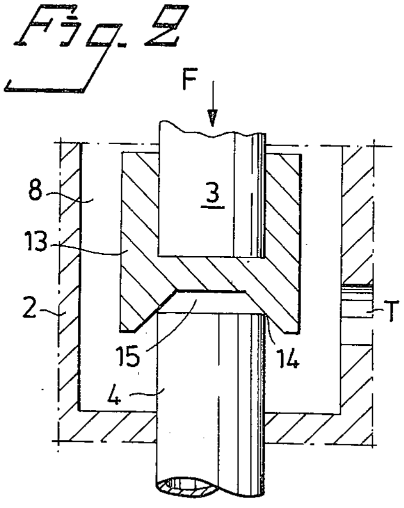
Figure 3:
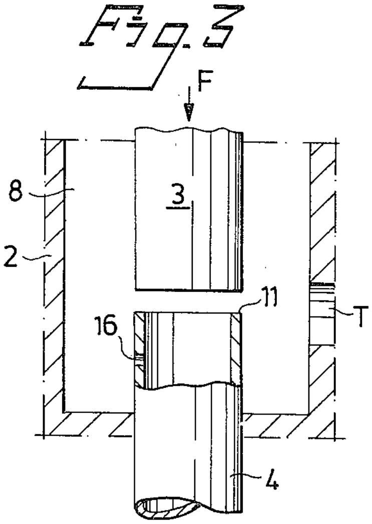

The invention is described in greater detail in the following, with reference to the accompanying drawing, in which FIG. 1 is a section through a converter according to the invention, FIG. 2 shows a modified embodiment of the pressure pin of a magnet, FIG. 3 shows a modified embodiment of the upper end of a piston.

In FIG. 1 a first embodiment of a converter 1 according to the invention is shown which comprises a housing 2, a pressure pin 3 associated with an electromagnet (not shown), a piston 4 and a return spring 5.

A pressure channel P for the supply of pressure medium, a control channel C for the inflow and outflow of control pressure medium to and, respectively, from a selector valve of a hydraulically operating machine, and a drainage channel T for draining the converter 1 are drilled in said housing.

The piston 4 runs in a cylinder bore 6, into which the pressure channel P opens. Beneath said bore 6 a lower cavity 7 is loacted, to which the control channel C is connected, and in which also the return spring 5 is located.

Above the piston bore 6 a cavity 8 is located, to which the drainage channel T is connected, and in which also the pressure pin 3 of an electromagnet is reciprocatory relative to the upper surface of the piston 4.

The piston 4 has the shape of a cylindric tube, the upper portion of which has the outer diameter D1 and the inner diameter D2. A lower portion of the piston has an outer diameter smaller than the outer diameter D1 at the upper end, so that a tubular space or cavity 9 is formed between the piston 4 and the bore 6. The lowermost portion of the piston 4 is formed with a widening, which consists of an outfolded conic portion 10 forming together with the transition of said lower cavity 7 to the bore 6 a first seat valve S1.

The upper end 11 of the piston 4 is plane and together with the plane end surface of the pressure pin 3 forms a second seat valve S2.

Due to the fact that the pressure channel P opens into the tubular cavity 9, the piston 4 is hydraulically fully balanced, so that oblique forces do not arise on the piston, which therefore runs very easily, in spite of pressure prevailing through the channel P in the cavity 9. The space 9 further is shaped so that the effective piston area in the longitudinal direction of the piston, defining the space 9 upward and downward, is of equal size.

Due to the first seat valve S1 having a diameter equal to the cylinder bore diameter, and said conic widening 10 forming an angle of 45° with the longitudinal axis of the piston 4, a large flow area in the seat valve S1 is obtained for a relatively small movement of the piston downward from its uppermost position. Also the second seat valve S2 yields a large flow area for pressure medium for a small distance between the pressure pin 3 and the upper end of the piston 4, because the outer diameter D1 of the piston exceeds only slightly the inner diameter D2 thereof. The basic function of the converter is as follows.

Upon an electric signal for the control circuit, for example a selector valve for the hydraulic system of a loading machine, to be put under pressure, the electromagnet (not shown) is supplied with current, whereby the pressure pin 3 is pressed outward against the piston 4, which thereby is pressed down. Pressure medium hereby flows through the channel P, bore 6, first seat valve S1 and out via the control channel C.

At the basic function of the converter where direct current is used for controlling a proportional magnet (electromagnet), the magnet presses the pressure pin 3 with a force F against the piston 4. The control pressure, i.e. the pressure in cavity 7, hereby rises to a level determined by the balancing of the magnet force F against the full coupling back force, which is equal to the control pressure $\times \pi(D1)^2/4$.

When the coupling back force has exceeded the magnet force F, the piston is moved up whereby the first seat valve S1 is closed.

When thereafter the magnet force is reduced, because a lower control pressure is desired, the second seat valve S2 is opened until balance prevails between the magnet force F and the hereby reduced coupling back force equal to the control pressure $\times \pi(D2)^2/4$. At drainage, a distance between the upper end of the piston 4 and the free end surface of the pressure pin 3 is formed, because the pressure pin 3 is retracted. The drainage takes place rapidly from the lower cavity 7 through the inner channel 12 of the piston 4 via the second seat valve S2 and out through the drainage channel T.

Factors influencing hysteresis are the return spring and differences in the full and, respectively, reduced coupling back area. The return spring being weak, and the difference between the last mentioned areas being small, the hysteresis effect is small. The converter, further, is not sensitive to dirt owing to large channels. Pressure build-up and drainage take place rapidly owing to large flow areas. Furthermore, no continuous oil consumption occurs, because the pressure channel P is closed against both channels C and T when the piston is in uppermost position. There is no overlap between inlet and outlet. The disadvantages with conventional converters mentioned above in the introductory portion, thus, are eliminated.

According to a second and a third embodiment, the hysteresis effect is eliminated substantially entirely.

According to the second embodiment shown in FIG. 2, the hysteresis effect due to differences in coupling back areas is overcome.

A shoe 13 attached on the pressure pin 3 is shaped so as together with the upper outer edge 14 of the piston 4 to form a cavity 15 above the piston whereby the effective piston area, the coupling back area, when the pressure pin abuts the piston, is the same both in closed and in open state of the first seat valve.

According to the thrid embodiment shown in FIG. 3, the converter is designed so at to operate with pressure build-up, i.e. a certain continuous oil consumption is permitted, in that a small hole 16 or a small slit is made close to the upper end 11 of the piston 4. According to this embodiment also the hysteresis effect of the return spring 5 is reduced.

No hysteresis effect, however, is obtained when the converter is used with an on-off-magnet instead of with a proportional magnet at pulsated voltage feed, which is the proper mode of operation of the present converter.

When using a function where fixed frequency and fixed pulse ratio, but varying voltage prevail, the hysteresis effect due to difference in the coupling back areas is entirely without importance, because drainage takes place automatically owing to the pulsation, i.e. the pressure pin 3 at the pulsation engages with and disengages from the piston. The magnet at this function need not be of proportional type, because when the pressure pin 3 arrives at the piston 4, an additional force is required for opening the first seat valve S1. This in its turn is due to the fact that, after the pressure pin has overcome the force corresponding to the area $\pi(D2)^2/4$, it also has to overcome the force corresponding to the area $\pi/4\cdot((D1)^2-(D2)^2)$.

In this position, namely, the magnet force F is compared with the coupling back area, whereby it is decided whether downward movement of the piston 4 will take place or not. The position of the pressure pin 3 relative to the magnet, thus, is always the same when comparison takes place, i.e. the free end surface of the pressure pin 3 abuts the upper end 11 of the piston 4 moved up, so that a proportional magnet is not required. On-off magnets have, instead, an advantage in that the force increases at increased stroke. The opening, i.e. downward pressing, of the piston then takes place very rapidly and resembles of a mechanic micro-switch function.

For drainage, a difference in said coupling back areas is desired, in order to ensure that the second seat valve S2 is closed, and that the piston 4 pushes back the pressure pin 3 with such a force, that the pressure pin continues inward to the magnet, after the piston 4 has stopped short due to the closing of the first seat valve S1. The second seat valve S2 then is opened very rapidly without the two seat valves S1,S2 being open simultaneously in any phase.

When using a function where fixed frequency and fixed voltage, but varying pulse length prevail, the resistance to inlet and outlet preferably is so adapted that at pulses with a length halfway between maximum and minimum length a control pressure C is obtained which is equal to half the feed pressure P. This ratio, of course, can be changed for obtaining a different characteristic. At short control pulses the mean pressure then is low, because the time for drainage by far exceeds the pressure build-up time. The opposite ratio yields a high mean pressure. The coupling back is at this function without importance.

It is, thus, fully clear that the present converter eliminates the aforementioned disadvantages, and at the same time permits two different modes of operation by utilizing pulsed voltage feed, whereby a substantially cheaper on-off-magnet replaces a relatively expensive proportional magnet.

The converter further is of simple construction and designed so that large flow areas are formed, which render possible a rapid control procedure.

The invention, however, is not to be regarded restricted to the embodiments described above, but of course can be varied within the scope of the attached claims.

I claim:

1. A converter for electrohydraulic or electropneumatic conversion, comprising a housing (2), a piston (4) movable in said housing (2), a pressure pin (3) reciprocatory by means of a magnet relative to the piston (4), a channel (P) for the supply of pressure medium, a control channel (C) for outflow and inflow of control pressure medium and a channel (T) for draining the converter, wherein the piston (4) is tubular and includes a channel (12) extending through the piston, which piston (4) runs in a cylinder bore (6) having uniform diameter, above and beneath which a respective upper and lower cavity (7, 8) are located, in the upper cavity (8) said pressure pin (3) is located and into which said drainage channel (T) opens, and into the lower cavity (7) the control channel (C) opens, wherein the pressure channel (P) opens into said cylinder bore (6), at a tubular space (9) located between the piston and the cylinder bore wall, which space extends downward to a lower end of the piston (4) where the lower end of the piston has a preferably conically shaped widening (10) so that the widening and the transition of the lower cavity to the cylinder bore (6) form a first seat valve (S1), which is closed when the piston is in an uppermost position, and wherein the upper end (11) of the piston together with the free end of the pressure pin (3) make a planar abutment to form a second seat valve (S2), and a week return spring (5) is provided to press the piston (4) against its uppermost position, and further wherein said space (9) is formed so that the outer diameter of the piston (4), at the space (9) is uniform and smaller than the general piston diameter, whereby the effective piston area defines an equal top and bottom of the space (9), and wherein the outer diameter (D1) of said upper end (11) of piston (4) only slightly exceeds its coplanar inner diameter (D2), and a small hole (16) or a small slit is made through the piston wall close to the upper end (11) of the piston (4).

2. A converter as defined in claim 1, wherein said widening (10) is conic and forms an angle of about 45° with the longitudinal axis of the piston (4), and the first seat valve (S1) has a large flow area for a small movement of the piston (4) downward from its uppermost position.

3. The converter as defined in claim 1 or 2, wherein said magnet operates only at either on or off energization.

* * * * *